Figure 1:
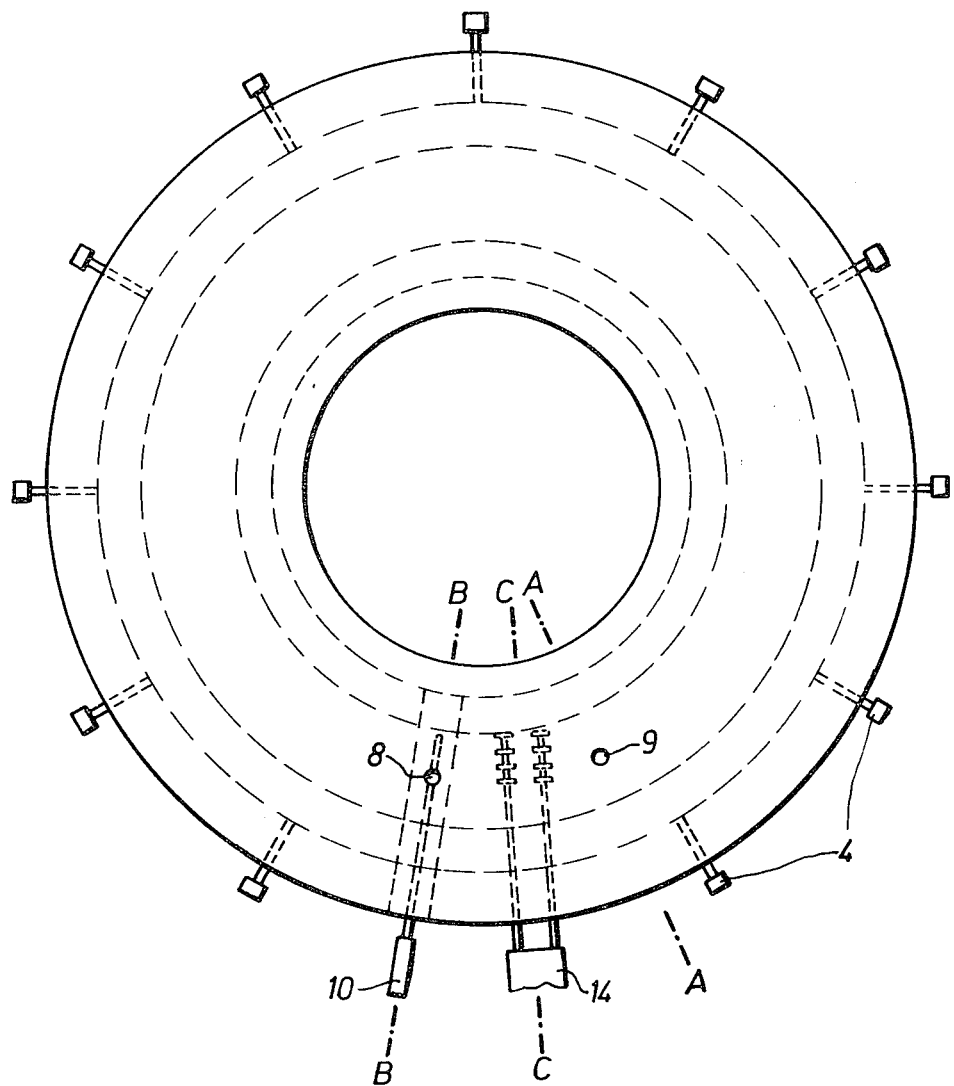

United States Patent [19]
Weber et al.

[11] 3,950,183
[45] Apr. 13, 1976

[54] PRODUCTION OF ANNEALED PIGMENTS
[75] Inventors: Horst Weber, Leverkusen; Siegfried Gruhl, Leichlingen; Karl-Heinz Endlich, Leverkusen, all of Germany
[73] Assignee: Bayer Aktiengesellschaft, Leverkusen, Germany
[22] Filed: Apr. 4, 1974
[21] Appl. No.: 457,738

[30] Foreign Application Priority Data
  Apr. 25, 1973  Germany............................ 2320806

[52] U.S. Cl. ........................ 106/309; 432/13; 34/31
[51] Int. Cl.² ............................................ C09C 3/00
[58] Field of Search ............ 106/309; 432/13; 34/31

[56] References Cited
UNITED STATES PATENTS
3,333,344  8/1967  Loewen ................................... 34/31
3,801,262  4/1974  Karkowski ............................ 432/13

Primary Examiner—Winston A. Douglas
Assistant Examiner—J. V. Howard
Attorney, Agent, or Firm—Burgess, Dinklage & Sprung

[57] ABSTRACT

In the production of annealed products such as inorganic pigments wherein pigment-forming starting materials are mixed, optionally with the addition of auxiliary substances, thereafter annealed, optionally ground, washed and then dried, the improvement which comprises adding water to the mixture of pigment-forming materials to form an aqueous suspension containing at least about 10% by weight of $H_2O$, and applying said suspension to the surface of a hearth which has been heated to at least about 500°C, thereby to heat said materials and to effect annealing. Advantageously the hearth is a horizontal, flat ring rotating about its center and in the course of one rotation of the ring the applied material is heated to the temperature of formation of the desired annealed product, calcined and removed from the surface of the ring before the one rotation has been completed.

4 Claims, 4 Drawing Figures

PRODUCTION OF ANNEALED PIGMENTS

This invention relates to a process for producing annealed products, such as finely crystalline inorganic pigments including ceramic coloring substances, which in some cases may be ground, washed and dried after the annealing process. The process is particularly suitable for producing the following inorganic pigments and ceramic coloring substances:

| System | Crystal structure | Usual range of temperature of formation | Colour |
|---|---|---|---|
| $(Ti,Sb,Ni)O_2$ | rutile | 900–1200°C | yellow |
| $(Ti,Sb,Cr)O_2$ | rutile | 900–1200°C | yellow to ochre |
| $(Cu,Co,Ni)(Cr,Fe,Mn)_2O_4$ | spinel | 1000–1300°C | black |
| $Zn(Cr,Fe,Al)_2O_4$ | spinel | 1000–1300°C | brown |
| $(Co,Ni,Zn)(Cr,Al)_2O_4$ | spinel | 1000–1300°C | blue |
| $(Co,Ni,Zn)_2TiO_4$ | spinel | 1000–1300°C | green |
| $Cr_2O_3$ | corundum | 800–1000°C | green |
| $(Cr,Fe)_2O_3$ | corundum | 900–1200°C | brown to black |
| $(Zr,V)SiO_4$ | zirconium | 850–1050°C | blue |
| $Zr(Si,Pr)O_4$ | zirconium | 850–1050°C | yellow |
| $(Cd,Zn)(S,Se)$ | wortzite | 500–700°C | yellow to red |

The process according to the invention is also suitable for producing sodium zirconium silicate from zirconium sand and caustic soda (800°–1100°C), for producing heavy metal silicates such as $CoSi_2O_5$ or $CuSi_2O_5$ (1000°–1200°C) or for converting finely divided metallic nickel to nickel oxide by atmospheric oxidation (900°–1050°C); the temperatures in brackets indicate in each case the usual temperature range of formation.

In conventional processes for producing annealed products of the type described above the starting materials are usually introduced as substantially dry mixtures into ceramic casings or dishes and heated to the required temperatures in furnaces which are usually heated by gas (hearth-type furnaces, batchfeed furnaces or tunnel-type furnaces). In another known process, the material which is to be annealed is spread out on a simple hearth-type furnace and turned by means of shovels or scrapers while it is being annealed. Other conventional methods include those of annealing in rotary drums, pipes or rotary discs in which the material is turned through cooled screws and conveyed from the inside outwards or from the outside inwards.

The only processes which are economically satisfactory are those which operate continuously and automatically so that no labor consuming operations are required between charging the furnace and receiving the end product. The processes which operate in this way are those mentioned above which employ rotary disc and rotary pipe furnaces and in which the operations of grinding, washing and drying carried out after the annealing process are also continuous and automatic. However, these installations operate economically only if the product is not frequently changed and if certain minimum quantities are produced (about 100 tons per month). If frequent change of product is necessary or only small quantities are produced, as is the case with most of the products mentioned as examples above, then it is necessary to use the other processes mentioned above, such as those employing hearth-type, batch feed or tunnel furnaces. The last mentioned process operates only intermittently and not very efficiently, and moreover it is difficult to obtain products which are consistent in quality because, in the case of many of the products, the quality is affected by the fact that in the conventional processes the temperature of the materials fluctuates considerably in the course of annealing and there is little margin for adjustment. One factor which causes this fluctuation in temperature when materials are annealed in casings is that the substance situated near the external wall of the casing reaches the required temperature more rapidly than the substance situated in the interior, whereas in the case of rotary disc or rotary pipe furnaces varying portions of the material stay in the furnace for varying lengths of time. In the type of annealing processes under discussion the chemical reaction, formation of nuclei and crystal growth depend very much on the temperature and its variation with time, and so temperatures which fluctuate and are not optimally adjusted are very liable to result in portions of the material remaining unreacted or poorly crystallized and also lead to the formation of by-products and to severe deviations of the sizes of the particles from the optimum size, a factor which frequently has a deleterious effect on the properties of the product in that, for example, pigments and coloring substances produced in this way have a less intense color or a weaker brightening power, lower covering power or inferior stability or dispersibility.

It is accordingly an object of the present invention to provide an improved simplified process for obtaining annealed pigments.

These and other objects and advantages are realized in accordance with the present invention which relates to a process for producing annealed products such as inorganic pigments wherein pigment-forming starting materials are mixed, optionally with the addition of auxiliary substances, thereafter annealed, optionally ground, washed and then dried. The novelty herein resides in adding water to the mixture of pigment-forming materials to form an aqueous suspension containing at least about 10% by weight of $H_2O$, and applying said suspension to the surface of a hearth which has been heated to at least about 500°C, thereby to heat said materials and to effect annealing.

It has surprisingly been found that many of the difficulties of the conventional processes in which the starting materials are applied substantially as a dry mixture to the surface of the hearth can be obviated by applying the starting materials to the heated surface of the hearth in the form of an aqueous suspension which may, if desired, also contain auxiliary substances. As is well known, the substances which are particularly suitable as starting materials are the oxides, hydroxides, nitrates, carbonates, sulfates, phosphates, fluorides, chlorides, sulfides and selenides of the metals or metalloids in the annealed products.

These starting materials are preferably used in a finely divided state. The auxiliary materials which may be added to the aqueous suspension or paste of the starting materials include acids and/or bases, and these may be used e.g. to adjust the mixture to a pH which is suitable for the process of formation of the annealed product. This pH may, of course, be different for various annealed products. Sulfuric acid and sodium hydroxide, for example, are particularly suitable acids and bases for this purpose, while conventional mineralizing agents, such as alkali metal fluorides, silicofluorides, alkali metal phosphates, borates, etc. may also be used as auxiliary substances as defined above. These mineralizing substances may be added, free from solvent, to the aqueous suspension which may be a paste or they may be formed in the course of the annealing process from the components in the aqueous suspension or paste. The water content of the suspensions or pastes applied to the surfaces of the hearth is at least about 10 % by weight and preferably about 30 to 70% by weight.

The temperature of the surface of the hearth on which the mixture of substances which is to be converted into the required annealed product is placed should be at least about 500°C and preferably at least about 800° to 1200°C.

A preferred embodiment of the process of the invention will be described in which the mixture of substances to be annealed is placed on the heated surface of a flat, horizontal ring which rotates about its center and in the course of one rotation of the ring the mixture is heated to the temperature of formation of the annealed product and calcined and the product is removed from the surface of the ring before the rotation has been completed.

Figure 2:
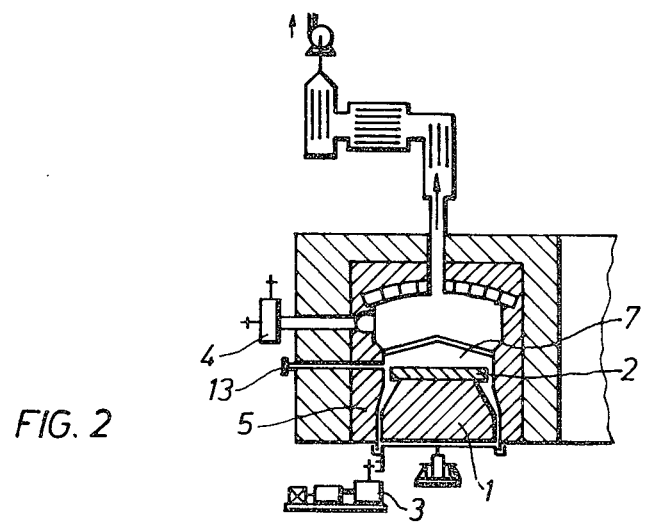
Figure 3:
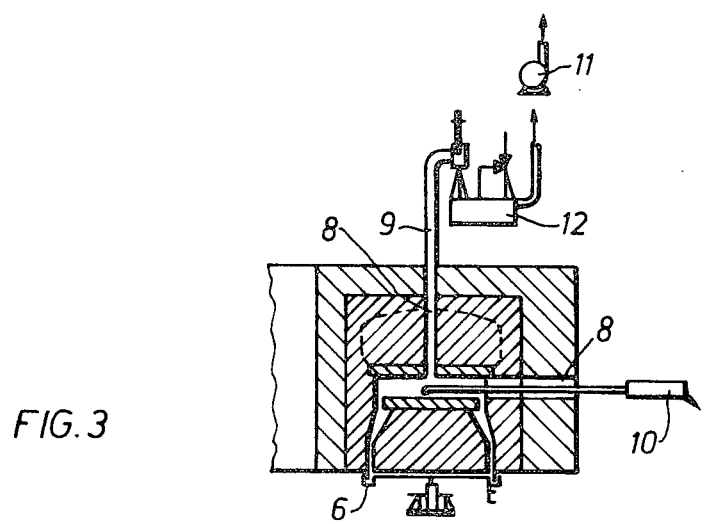
Figure 4:
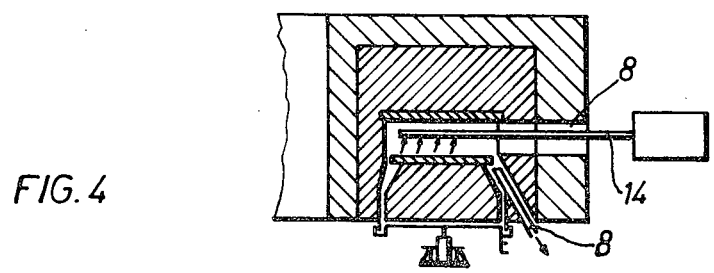

A hearth of this type, hereinafter referred to as "rotary ring furnace" will now be described with reference to the accompanying drawings, wherein:

FIG. 1 is a plan view of the hearth;
FIG. 2 is a section along line A—A of FIG. 1;
FIG. 3 is a section along line B—B of FIG. 1; and
FIG. 4 is a section along line C—C of FIG. 1.

The reference numerals in the figures have the following meanings:

1 = rotatable ring
2 = ring surface
3 = speed adjuster to control the speed of rotation
4 = burner
5 = refractory side walls
6 = sand cups
7 = annular gap
8 = openings in annular gap
9 = openings to remove waste gases and vapors formed by evaporation
10 = feed station for starting materials
11 = ventilator or chimney draft
12 = waste gas purification
13 = openings for supply of gases
14 = scraper for removing the annealed product Referring to FIG. 1 in detail, it shows a horizontal ring 1 which is rotatable about its center. Its upper surface 2 is plane and is preferably made of a refractory ceramic material several centimeters thick and heat insulated on its lower surface. The ring may have any diameter and width. Its speed of rotation is adjustable (3). The surface of the ring is preferably heated from above by means of a row of fixed burners (4), e.g. gas or oil burners or infrared or short wave radiators. Electric heating or retort furnace heating may also be employed. The fixed part of the burner should preferably be extended downwards as far as the rotary ring by means of refractory side walls 5 and connected to the ring by means of two suitably shaped sand cups 6. An annular gap 7 is thereby formed between the rotary ring and the burner. This gap 7 is closed at the top and bottom and at the sides except for several apertures 8.

The vapors formed in the process and other gases can escape through one or more openings 9, preferably above the feed station 10, and can be removed through a ventilator or chimney 11 to be carried to a gas purification plant 12. For reactions in which oxygen is consumed, the necessary supply of air can be provided through other openings 13 at the sides, which may be adapted to be completely or partly closed. Other gases may also be introduced, e.g. nitrogen. The feed device for the starting materials and a device 14 for removing the product from the surface of the ring, preferably an automatic scraper, are situated in an opening in the fixed side walls.

In the process according to the invention, the starting materials must be mixed with water before they are annealed, as has already been described above. In many cases it is sufficient to use about 20 to 40% by weight of water, based on the total weight of starting materials. The addition of water has the effect of converting the starting materials into a suspension which may be thin or paste-like. No harm is done if part of the starting material dissolves. The addition of water enables the materials to be applied to the hot surface of the ring without any loss. It also ensures that the material being annealed does not stick to the surface of the ring because of evaporation of water but lies on the ring as a loose layer.

The usual feed devices are used for applying the starting mixture to the hot surface of the ring, for example pastes or suspensions are advantageously forced by means of pumps or screws into a pipe, one end of which automatically moves continuously across the surface of the ring so that the mixture is spread evenly over the surface as a layer of uniform thickness. It has been found suitable to apply layers of about 0.5 to 5 cm in thickness. Even in the case of thin liquid suspensions it is not necessary to use a special device to prevent the mixture spilling over the edge, provided the movement of the feed pipe is controlled so that a margin of several centimeters at the edge of the ring is kept free from the jet of suspension. Since the temperature of the surface of the ring is slightly higher at the edges, the water evaporates more rapidly there than at the center of the layer of suspension. A solid edge therefore rapidly forms to prevent the suspension spreading over the edge of the ring. The surface of the ring is heated to temperatures of at least 500°C. The material placed on the ring is heated to the temperature of formation of the product in the course of one rotation of the ring. The variation of temperature with time during the period of heating up and of annealing can be controlled and varied within wide range and can be adapted to the desired conditions by varying the strength of the individual burners (in special cases, cooling zones may be provided through which the material on the ring will pass in the course of the rotation of the ring) and by varying the speed of rotation of the ring and of the aqueous mixture on it.

The annealed product is removed from the surface of the ring at the delivery station. Once a segment of the ring has been emptied, it may either be covered with fresh material while it is still at the same temperature or its temperature may first be adjusted by heating or cooling devices between the delivery station and feed station. Any desired arrangement may be employed.

The process according to the invention permits a more uniform adjustment of the temperature variation with time for the annealing process and by providing a greater scope for variation it enables the variation of temperature with time to be adapted more closely to the optimum conditions for formation of the individual products. The new process can be carried out continuously and automatically, it is economically advantageous especially for producing small quantities and it enables qualitatively superior products to be obtained.

For most purposes, annealed products must be ground, washed and dried after the annealing process. They may be dry-ground in accordance with the known art in pebble mills, vibratory mills, bowl mills, pinned disc mills or impact pulverizers, in some cases after first breaking them down in crushers, Wet grinding may also be carried out, if desired in combination with dry grinding by adding water in pebble mills or vibratory mills. After wet grinding, the ground products are usually washed by alternately diluting with wash water and thickening by decanting or filtering. The purpose of this is to remove salts adhering to the products. Drying may then be carried out on shelf driers, in drying drums, on drying discs, in spray driers or on belt conveyor driers.

The process according to the invention will now be described in the following illustrative examples wherein all parts are by weight unless otherwise expressed.

EXAMPLE 1

Preparation of a Co $Al_2O_4$ spinel pigment

A suspension, prepared in proportions of 700 kg of cobalt oxide $Co_3O_4$ to 1500 kg of aluminum hydroxide $Al(OH)_3$ to 2000 liters of water $H_2O$, is fed into a pipe by feed pumps at the rate of 250 kg/h. One end of the pipe is constantly moved backwards and forwards across the surface of the ring of a rotary ring furnace at a height of about 5 to 10 cm above the ring.

The rotary ring furnace has an external diameter of about 8 m and comprises a rotary ring about 0.8 m in width which is covered with a refractory ceramic plate lining about 5 cm in thickness, a muffle situated about 0.3 m above the surface of the rotary ring and heated by ten gas-air burners distributed along the length of the ring, vapor exhaust above the feed station and, situated about 0.5 m in front of the feed station viewed in the direction of rotation, an automatic scraper device consisting of three refractory ceramic plates loosely suspended on a moving water-cooled pipe. The rotary ring is rotated at the rate of one rotation per hour by means of an infinitely adjustable driving means. The burner, exhaust, openings and cooling devices are so adjusted that the surface temperature of the rotary ring is about 1000°C to 1100°C shortly before the feed station and the temperature of the product is 1320°C in the region extending from one-third of the distance along the ring from the feed station to the point of delivery of the product.

In cases where the mixture of starting materials is applied as a suspension it forms a layer about 2 cm deep which has a very loose texture and lies loosely on the surface of the rotary ring. At the delivery station, the hot product drops continuously into a water filled container equipped with a stirrer, from which the product is removed at the rate of 100 kg/h by means of a feed pump and in which the quantity of water removed with the product is continuously replaced by fresh water. The suspension may then be worked up in a conventional manner as follows:

Wet-grinding in a pebble mill, drying of the suspension on a conveyor band drier and finally dry-grinding in an impact pulverizer.

EXAMPLE 2

Preparation of a (ti, Sb, Cr)$O_2$ rutile yellow pigment

A suspension, prepared by adding starting materials in the proportions of 800 kg of titanium dioxide $T_iO_2$, 90 kg of antimony oxide $Sb_2O_3$ and 45 kg of chromium oxide $Cr_2O_3$ to 2000 l of water, is treated in the same way as described in Example 1, except that the surface temperature of the rotary ring just before the feed staton is not 1000° to 1100°C but 800° to 900°C and the temperature of the product in the region extending from half the length of the ring removed from the feed station to the point of delivery of the product is 1050°C.

An orange yellow rutile pigment is obtained, which has an intensity of color about 30 percent greater than that of products produced by the usual processes. The pigment is particularly suitable for coloring lacquers, dispersion paints, synthetic resins, enamels, ceramic masses and plasters.

EXAMPLE 3

Preparation of sodium zirconium silicate

A suspension, prepared from starting materials used in the proportions of 2000 kg of zirconium sand $ZrSiO_4$ and 1000 kg of sodium hydroxide NaOH to 1500 liters of water $H_2O$, is treated on the rotary ring furnace described in Example 1 in the same manner as described there, except that the surface temperature of the rotary ring shortly before the feed station is not 1000° to 1100°C but 800° to 900°C and the temperature of the product in the region extending from one third of the length of the ring removed from the feed station to the point of delivery of the product is 1080°C.

The resulting sodium zirconium silicate has a molar composition of about 1.1 $Na_2O$. $SiO_2$ and is suitable for the preparation of zirconium color pigments (see Example 4), zirconium oxide $ZrO_2$ or zirconium salts.

EXAMPLE 4

Preparation of a (Zr, V)$SiO_4$ zirconium blue pigment

A suspension, prepared from starting materials in the proportions of 1400 kg of sodium zirconium silicate 1.1 $Na_2O$. $SiO_2$, 50 kg of ammonium vanadate $NH_4VO_3$ and 800 kg of sulfuric acid $H_2SO_4$ to 3000 l of water $H_2O$, is treated in the same way as described in Example 1, except that the surface temperature of the rotary ring just before the feed station is not 1000° to 1100°C but 800° to 900°C, the speed of rotation of the ring is adjusted to 1.5 rotations per hour and the temperature of the product in the region extending from one third of the length of the ring removed from the feed station to the point of delivery of the product is 1030°C.

The resulting blue zirconium pigment has an intensity of color which is more than 10 percent times greater than that of products prepared by previously known processes. The pigment is particularly suitable for coloring enamels, ceramic glazes and plasters.

EXAMPLE 5

Preparation of finely divided nickel oxide NiO from metallic nickel catalyst residues A suspension, prepared by using 1000 kg of nickel catalyst residues having a nickel content of 50 percent (remainder organic polymers) to 1000 kg of water, is treated on the rotary ring furnace described in Example 1 in the same manner as described there, except that the surface temperature of the rotary ring just before the feed station is 700° ot 800°C, approximately 3000 Nm$^3$/hour of air is passed over the material opposite to the direction of rotation of the ring through five openings in the side wall uniformly distributed over the ring, and the temperature of the product in the region extending from about one quarter of the length of the ring to about three-quarters of the length of the ring from the feed station is 900°C and, in the region extending from about three-quarters of the length of the ring from the feed station to the point of delivery of the product, is 1050°C.

A very finely divided nickel oxide with an average particle size of less than 1 μm is obtained. The oxide is very suitable for use as an adhesive for enamel and also constitutes an easily distributed and highly reactive Ni component for the production of other products.

It will be appreciated that the instant specification and examples are set forth by way of illustration and not limitation, and that various modifications and changes may be made without departing from the spirit and scope of the present invention.

What is claimed is:

1. In the production of annealed products such as inorganic pigments wherein pigment-forming starting materials are mixed, optionally with the addition of auxiliary substances, thereafter annealed, optionally ground, washed and then dried, the improvement which comprises adding water to the mixture of pigment-forming materials to form an aqueous suspension containing at least about 10% by weight of $H_2O$, applying said suspension to the horizontal flat ring surface of a hearth which has been heated to at least about 500°C, rotating said ring about its center so that in the course of one rotation of the ring the applied material is heated to the temperature of formation of the desired annealed product, calcined and removed from the surface of the ring before the one rotation has been completed.

2. The process according to claim 1 in which the water content of the suspension applied to the surface of the hearth is between about 30 and 70 percent by weight.

3. The process according to claim 1 in which the temperature of the surface of the hearth at the point where the suspension is applied is about 800° to 1200°C.

4. The process according to claim (4) 1, in which the water content of the suspension applied to the surface of the hearth is between about 30 and 70 percent by weight and the temperature of the surface of the hearth at the point where the suspension is applied to about 800° to 1200°C.

* * * * *